(12) United States Patent
Tebeka et al.

(10) Patent No.: US 10,876,416 B2
(45) Date of Patent: Dec. 29, 2020

(54) VANE SEGMENT WITH RIBS

(71) Applicant: PRATT & WHITNEY CANADA CORP., Longueuil (CA)

(72) Inventors: Jonathan Tebeka, Montréal (CA); Franco Di Paola, Montreal Nord (CA); Jasrobin Grewal, Pincourt (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/047,304

(22) Filed: Jul. 27, 2018

(65) Prior Publication Data
US 2020/0032661 A1    Jan. 30, 2020

(51) Int. Cl.
*F01D 9/04* (2006.01)
*F01D 25/24* (2006.01)

(52) U.S. Cl.
CPC ........... *F01D 9/041* (2013.01); *F01D 25/246* (2013.01); *F05D 2220/32* (2013.01); *F05D 2240/12* (2013.01); *F05D 2240/80* (2013.01)

(58) Field of Classification Search
CPC ..... F01D 9/00; F01D 9/02; F01D 9/04; F01D 9/041; F01D 25/246; F05D 2220/32; F05D 2240/12; F05D 2240/80
See application file for complete search history.

(56) References Cited

U.S. PATENT DOCUMENTS

| | | | |
|---|---|---|---|
| 3,319,930 A * | 5/1967 | Howald | F01D 25/246 415/190 |
| 3,403,889 A | 10/1968 | Ciokajlo | |
| 9,322,281 B2 | 4/2016 | Schlemmer et al. | |
| 9,500,088 B2 | 11/2016 | Schlemmer et al. | |
| 2008/0038113 A1* | 2/2008 | Matsumoto | F01D 5/147 415/209.4 |
| 2009/0185899 A1* | 7/2009 | Bouchard | F01D 9/02 415/209.3 |
| 2015/0016972 A1* | 1/2015 | Freeman | F01D 5/189 415/175 |
| 2016/0194969 A1 | 7/2016 | Ols et al. | |
| 2018/0100516 A1 | 4/2018 | Onfray et al. | |

FOREIGN PATENT DOCUMENTS

FR    2953252 A1 *  6/2011  ............ F01D 9/041
WO    2009/083567 A1  7/2009

\* cited by examiner

*Primary Examiner* — Nathaniel E Wiehe
*Assistant Examiner* — Eric A Lange
(74) *Attorney, Agent, or Firm* — Norton Rose Fulbright Canada LLP

(57) ABSTRACT

There is disclosed a vane segment for a gas turbine engine. The vane segment includes vanes extending radially from inner ends to outer ends. The vanes have leading edges, trailing edges, and chords extending from the leading edges to the trailing edges. A platform circumferentially extends around the central axis. The platform has an inner face facing the central axis and an opposed outer face. The inner face of the platform is connected to the outer ends of the vanes. Ribs protrude away from the outer face and have lengths extending along the outer face.

20 Claims, 3 Drawing Sheets

VANE SEGMENT WITH RIBS

TECHNICAL FIELD

The application relates generally to gas turbine engines and, more particularly, to vane segments and to method of manufacturing vane segments for gas turbine engines.

BACKGROUND OF THE ART

Segmented vane designs are typically used in high-pressure and low-pressure turbines of the gas turbine engine because, at these locations, high temperatures of the gas path render difficult the use of a vane ring design. Vane segments of the segmented vane designs are subjected to fatigue stress caused by high vibratory stress that induces cracks over time. There is a need for improvement.

SUMMARY

In accordance with one aspect, there is provided a vane segment for a gas turbine engine having a central axis, the vane segment comprising: vanes extending radially from inner ends to outer ends relative to the central axis, the vanes having leading edges, trailing edges, and chords extending from the leading edges to the trailing edges, the vanes being non-rotating relative to the central axis; a platform circumferentially extending around the central axis of the gas turbine engine, the platform having an inner face facing the central axis and an opposed outer face, the inner face of the platform connected to the outer ends of the vanes; and ribs protruding away from the outer face and having lengths extending along the outer face, at least one of the lengths being oriented in a manner to intersect a corresponding one of projections of the chords.

In accordance with another aspect, there is provided a gas turbine engine comprising a turbine section, the turbine section including stators and rotors disposed in alternation along a central axis, at least one of the stators having vane segments circumferentially distributed around the central axis, the vane segments having vanes extending radially from inner ends to outer ends relative to the central axis, the vanes having leading edges, trailing edges, and chords extending from the leading edges to the trailing edges, a platform circumferentially extending around the central axis and being secured to a casing, the platform having an inner face facing the central axis and an opposed outer face, the inner face of the platform connected to the outer ends of the vanes, and ribs protruding away from the outer face and having lengths extending along the outer face, at least one of the lengths being oriented in a manner to intersect a corresponding one of projections of the chords.

In accordance with still another aspect, there is provided a method of manufacturing a vane segment, comprising: creating a platform with a curved shape for circumferentially extending around an axis; creating ribs on an outer face of the platform, the ribs extending from the outer face and away from the axis; creating vanes having outer ends connected to an inner face of the platform, the vanes being aligned with the ribs such that projections of chords of the vanes intersect lengths of the ribs.

DESCRIPTION OF THE DRAWINGS

Reference is now made to the accompanying figures in which.

DETAILED DESCRIPTION

Figure 1:
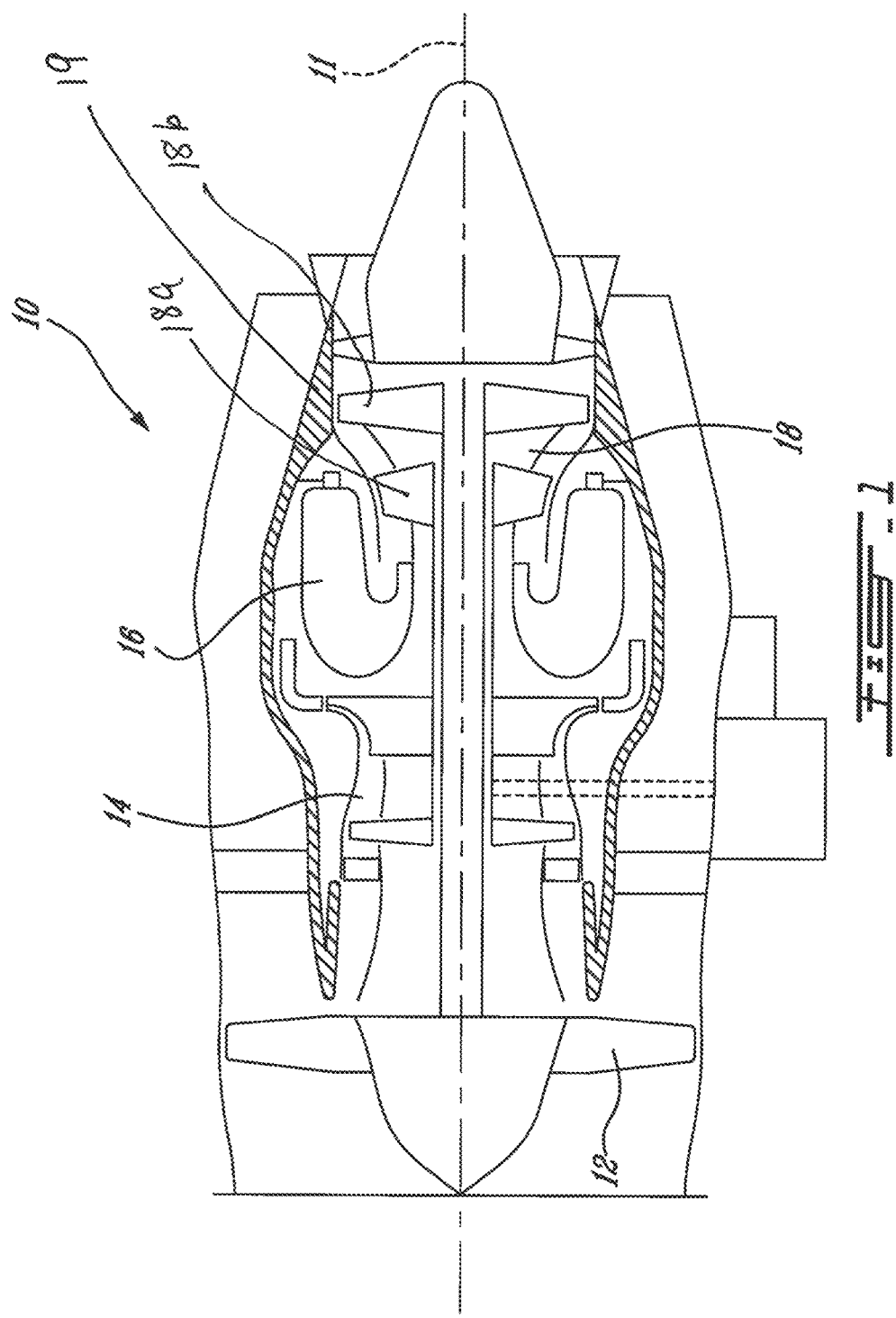
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11 of the gas turbine engine 10.

Figure 2:
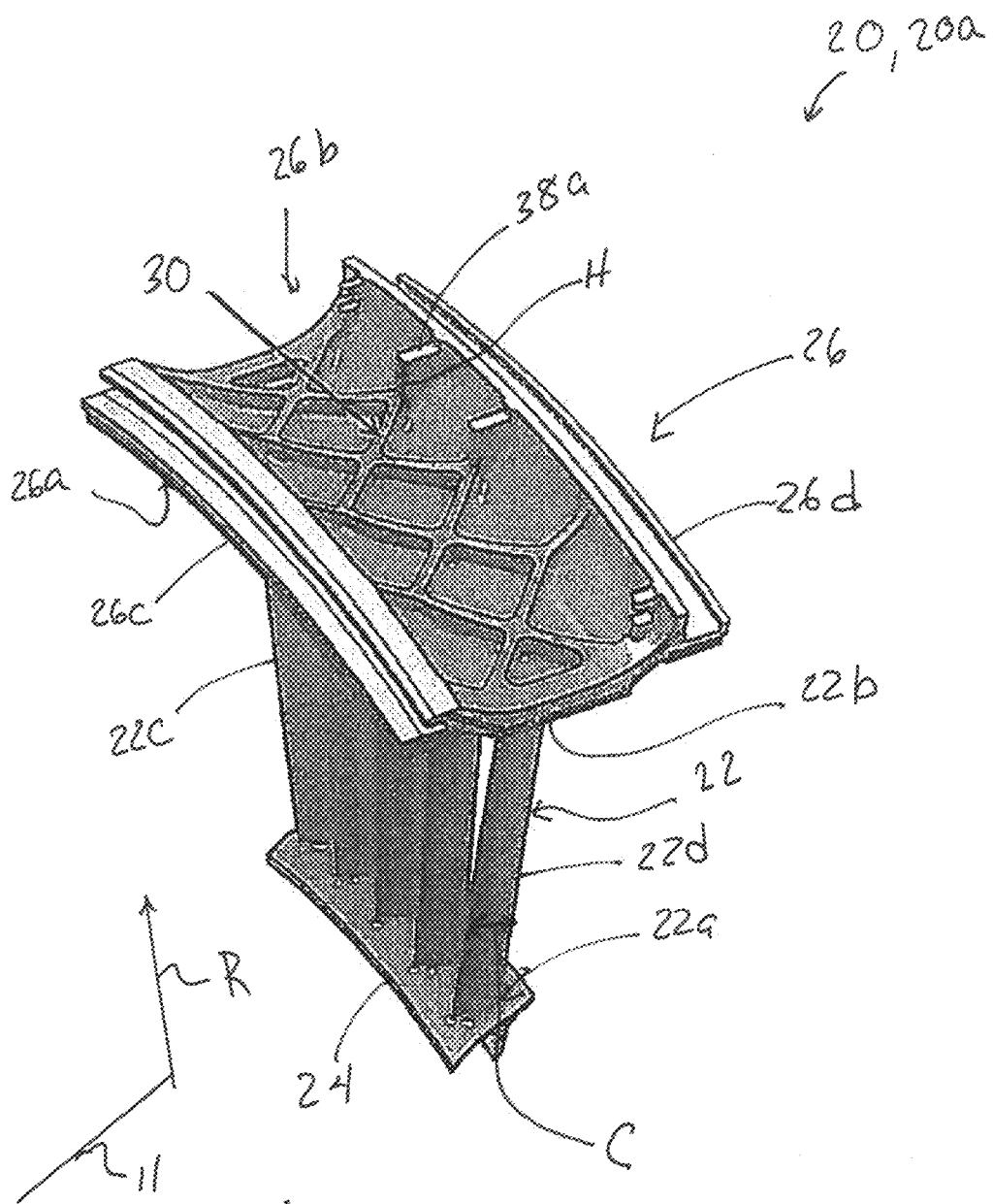
FIG. 2 is a schematic tridimensional view of a vane segment of the gas turbine engine of FIG. 1.

The turbine section 18 includes a high pressure turbine 18a and a low pressure turbine 18b, each of which has stators 20 (FIG. 2) and rotors disposed in alternation along the central axis 11. The rotors include blades whereas the stator includes vanes 22 (FIG. 2). The blades and the vanes 22 are circumferentially distributed around the central axis 11. Herein, the expression "vane" is dedicated to a part of a stator. A stator is by definition rotationally static in the sense that it does not rotate about the central axis 11 during operation of the engine. The vanes 22 of the stators 20 are therefore non-rotating relative to the central axis 11. It is understood herein that the expression "non-rotating" should be construed as allowing a certain degree of rotational movement about the central axis 11 that may be imputed to a play that exists between the stators and a casing 19 of the gas turbine engine 10 on which the stators 20 are secured.

For the stator, two types of designs are commonly used: segmented vane design and vane ring design. In a vane ring design, the stator is a monolithic piece that includes all of the vanes. In a segmented vane design, the stator includes a plurality of vane segments, each including at least one vane, that are disposed circumferentially around the central axis to form the stator.

Referring now to FIG. 2, a vane segment of the stator 20 is generally shown at 20a. The vane segment 20a may be part of a stator of the compressor section 14, of the high pressure turbine 18a, or of the low pressure turbine 18b.

The vane segment 20a includes the vanes 22 extending radially from inner ends 22a to outer ends 22b relative to the central axis 11. As shown, the inner ends 22a are connected to a radially inner platform 24 and the outer ends 22b are connected to a radially outer platform 26. More specifically, the radially outer platform 26 has an inner face 26a that faces the central axis 11 and an opposed outer face 26b that faces away from the central axis 11. The outer ends 22b of the vanes 22 are connected to the inner face 26a of the radially outer platform 26.

The vanes 22 have leading edges 22c, trailing edges 22d, and chords C extending from the leading edges 22c to the trailing edges 22d. More specifically, each of the vanes 22 is composed of airfoil sections disposed from its inner end 22a to its outer end 22b along a spanwise direction. Each of the airfoil sections has a leading edge, a trailing edge, and a chord extending has a straight line from the leading edge to the trailing edge. The leading edges 22c and the trailing edges 22d of the vanes 22 are therefore lines, that may be curved, extending from the radially inner platform 24 to the radially outer platform 26.

The radially outer platform 26 circumferentially extends around the central axis 11 of the gas turbine engine 10. When the stator 20 includes more than one vane segment 20a, each of the vane segment 20a extends along a portion of a full circumference of the stator 20 relative to the central axis 11. In a particular embodiment, the stator 20 includes only one vane segment 20a, the vane segment 20a circumferentially extending along the full circumference of the stator 20.

It has been observed that the high velocity flow that circulates around the vanes 22 of the vane segments 20a of the stator 20 as well as rotor and shaft unbalance, can induce high vibratory stress if natural resonance frequencies are excited. A consequence of this stress is that it induces fatigue issues. More specifically, after prolonged use, cracks develop within the vane segments 20a as a result of high cycle fatigue. This is undesirable because it shortens the lifespan of the vane segments 20a.

To overcome this problem, the stiffness of the vane segment 20a should be increased to avoid natural resonance frequency excitation. However, increasing the stiffness is often correlated with an increase in the weight of the vane segment 20a and hence a loss of overall efficiency of the gas turbine engine 10. Consequently, there is a compromise to be made between the stiffness and weight.

Figure 3:
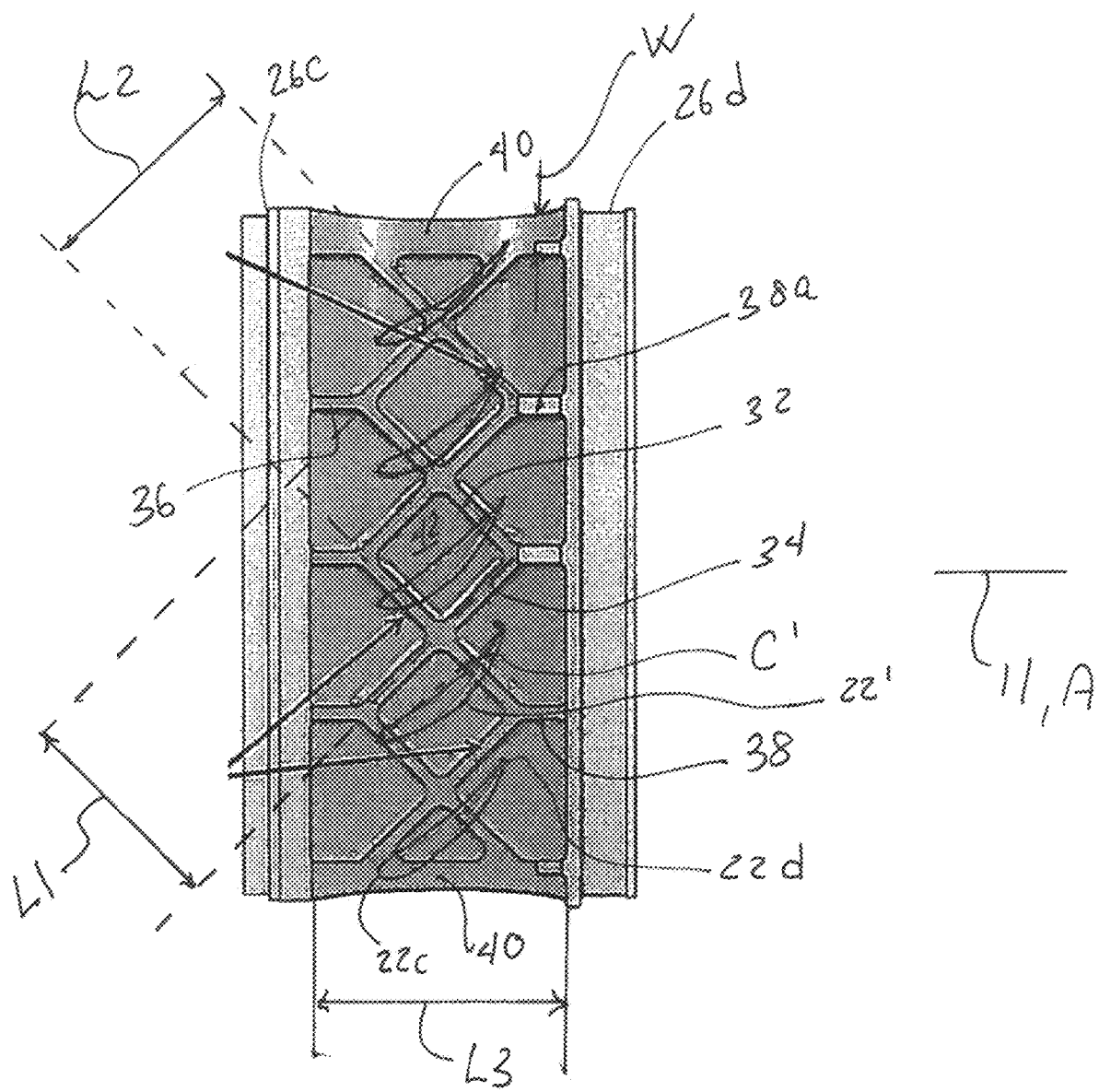
FIG. 3 is a schematic top view of the vane segment of FIG. 2.

Referring now to FIGS. 2-3, the vane segments 20a further includes a lattice structure 30 at the outer face 26b of the radially outer platform 26. The radially outer platform 26 includes a fore rail 26c and an aft rail 26d that are securable to the casing 19 of the gas turbine engine 10. The lattice structure 30 is located axially between the fore and aft rails 26c, 26d relative to the central axis 11.

In the embodiment shown, the lattice structure 30 includes ribs 32, stiffeners 34, fore axial ribs 36 aft axial ribs 38, and end ribs 40. Each of the ribs 32, the stiffeners 34, the fore and the aft axial ribs 36, 38, and the end ribs 40 protrude away from the outer face 26b of the radially outer platform 26. Each of these are described in more detail herein below.

Referring more particularly to FIG. 3, the ribs 32 have lengths L1 that extend along the outer face 26b of the radially outer platform 26. On FIG. 3, projections 22', C' of the vanes 22 and of chords C are illustrated to show their relative position with respect to the ribs 32. The vane projections 22' that are shown corresponds to projections of the airfoil sections of the vanes 22 that are located at the outer ends 22b of the vanes 22. The vane projections 22' are obtained by projecting the outer ends 22b of the vanes 22 along a radial direction R relative to the central axis 11 and on the outer face 26b of the radially outer platform 26. As the outer face 26b may be a curved surface, the projections 22', C' may be similarly curved to match the shape of the radially outer platform outer face 26b.

As illustrated, at least one of the lengths L1 is oriented in a manner to intersect a corresponding one of the chord projections C'. In the embodiment shown, the at least one of the lengths L1 perpendicularly intersects the corresponding one of the chord projections C'. In a particular embodiment, having the lengths L1 of the ribs 32 intersecting the chord projections C' allows to increase the stiffness of the radially outer platform 26 such that its natural vibration frequencies are above known forcing frequencies due to mechanical and aerodynamic sources and hence allows to decrease the dynamic stress induced to the vane segment 20a. More specifically, the ribs 32 being perpendicular to the vanes 22 can allow the resonance frequency of the vane segment 20a to become above that of the main shafts of the gas turbine engine 10, with a limited amount of additional weight. In a particular embodiment, the disclosed ribs 32 increase both of an axial and a tangential (or circumferential) stiffness of the vane segment 20a relative to the central axis 11.

In the depicted embodiment, each of the lengths L1 of the ribs 32 intersects a respective one of the chord projections C'. More specifically, and in accordance with the depicted embodiment, each of the lengths L1 of the ribs 32 intersects two adjacent ones of the chord projections C'.

In the embodiment shown, each of two adjacent ones of the chord projections C' is intersected by one of the lengths L1 of the ribs 32. More specifically, one of the two adjacent ones of the chord projections C' is intersected by the one of the lengths L1 near its leading edge 22c and the other of the two adjacent ones of the chord projections C' is intersected by the one of the lengths L1 near its trailing edge 22d.

Now that the ribs 32 have been described, the stiffeners 34 are described herein below. The stiffeners 34, as the ribs 32, protrude away from the outer face 26b of the radially outer platform 26 and have stiffener lengths L2 that extend along the outer face 26b. In the depicted embodiment, the stiffener lengths L2 are oriented substantially parallel to the chord projections C'. In a particular embodiment, the stiffeners 34 allows to further increase the axial stiffness of the vane segment 20a.

In the embodiment shown, the stiffener lengths L2 are free of intersection with the chord projections C'. The stiffener lengths L2 may be equal to the lengths L1 of the ribs 32. In the embodiment shown, the stiffeners 34 perpendicularly intersect the ribs 32 at their respective centers. As shown, cooperation of the stiffeners 34 and the ribs 32 defined a series of square-shaped cavities 42 circumferentially distributed around the central axis 11.

The fore and aft axial ribs 36, 38 are now described. In the embodiment shown, the fore and aft axial ribs 36, 38 extend axially relative to the central axis 11. The fore axial ribs 36 extend along an axial direction A relative to the central axis 11 from the fore rail 26c toward the aft rail 26d and the aft axial ribs 38 extend from the aft rail 26d toward the fore rail 26c along the axial direction. In the embodiment shown, each of the fore and aft axial ribs 36, 38 are connected to an end of a respective one of the ribs 32. More specifically, and in accordance with the depicted embodiment, each of the fore axial ribs 36 is connected to a respective one of the rear axial ribs 38 via a respective one of the ribs 32.

In the depicted embodiment, each of the fore and aft axial ribs 36, 38 are connected to an end of a respective one of the stiffeners 34. More specifically, and in accordance with the depicted embodiment, each of the fore axial ribs 36 is connected to a respective one of the rear axial ribs 38 via a respective one of the stiffeners 34. The rear axial ribs 38 and the fore axial ribs 36 can strengthen the axial load path between the upper platform and the supporting ledges.

As shown more clearly on FIG. 2, some of the rear axial ribs 38a have a radial height H relative to the central axis 11 and extending from the outer face 26b to a tip thereof that is greater than that of the others of the rear axial ribs 38. In this embodiment, these higher axial ribs 38a were also used as anti-rotation features.

Referring back to FIG. 3, the end ribs 40 are located at the outer face 26b of the radially outer platform 26 and protrude away therefrom and away from the central axis 11. The end ribs 40 are located at circumferential extremities of the vane segment radially outer platform 26 and contribute in increasing axial stiffness as well as strengthening the load path between the front and read supports. As shown, the end ribs 40 have lengths L3 extending axially relative to the central axis 11 from the fore rail 26c to the aft rail 26d and widths W extending circumferentially relative to the central axis 11.

The widths W of the end ribs 40 are greater than that of any of the ribs 32, fore and aft axial ribs 36, 38, and the stiffeners 34.

A vane segment 20a having been set forth, a method of manufacturing a vane segment 20a is now describe. To manufacture the vane segment 20a, the radially outer platform 26 is created with a curved shape for circumferentially extending around the central axis 11. Ribs 32 are created on the outer face 26a of the radially outer platform 26. The ribs 26a extend from the outer face 26a and away from the axis 11. The vanes 22 are created with outer ends 22b connected to the inner face 26a of the radially outer platform 26. The vanes 22 are aligned with the ribs 32 such that the projections of the chords C' of the vanes 22 intersect the lengths L1 of the ribs 22.

In the depicted embodiment, creating the vanes 22 include creating the vane 22 such that the projections of the chords C' of the vanes 22 perpendicularly intersect the lengths L1 of the ribs 32. In the embodiment shown, the method further includes creating the stiffeners 34, the fore axial ribs 36, the rear axial ribs 38, and the end ribs 40.

In a particular embodiment, the ribs 22 stiffen the vane segment 20a in both the axial and circumferential directions relative to the central axis 11 for increasing effectiveness as an angle of attack of the vanes 22 causes a coupling of axial and tangential motions in cantilevered modes. This might allow to incorporate segmented vane design in the low pressure turbine 18b in which the temperature is lower than that in the high pressure turbine 18a. This might allow to minimize tip clearance and improve the turbine efficiency.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A vane segment for a gas turbine engine, the vane segment comprising:
   vanes extending radially relative to a central axis, from inner ends to outer ends relative to the central axis, the vanes having leading edges, trailing edges, and chords extending from the leading edges to the trailing edges, the vanes being non-rotating relative to the central axis;
   a platform extending circumferentially relative to the central axis, the platform having a radially inner face and an opposed outer face, the inner face of the platform connected to the outer ends of the vanes; and
   ribs protruding away from the outer face and having lengths extending along the outer face, at least one of the ribs intersecting a corresponding one of projections of the chords, the at least one of the ribs extending at least partially axially relative to the central axis, one of two adjacent ones of the projections of the chords intersected by a respective one of the ribs adjacent a leading edge of the one of two adjacent ones of the projections of the chord, the other of the two adjacent ones of the projections of the chords intersected by the respective one of the ribs adjacent a trailing edge of the other of the two adjacent ones of the projections of the chords.

2. The vane segment of claim 1, wherein the at least one of the ribs perpendicularly intersects the corresponding one of the projections of the chords.

3. The vane segment of claim 1, wherein each of the ribs intersects a respective one of the projections of the chords.

4. The vane segment of claim 1, wherein each of the ribs intersects two adjacent ones of the projections of the chords.

5. The vane segment of claim 1, further comprising stiffeners protruding away from the outer face and having lengths extending along the outer face, the lengths of the stiffeners intersecting the lengths of the ribs.

6. The vane segment of claim 5, wherein at least one of the lengths of the stiffeners is free of intersection with the projections of the chords.

7. The vane segment of claim 1, further comprising stiffeners protruding away from the outer face and having lengths extending along the outer face, the stiffeners perpendicularly intersecting the ribs.

8. The vane segment of claim 1, wherein the platform includes a fore rail and an aft rail, defined axially relative to the central axis, configured to be secured to a casing of the gas turbine engine, the outer face extending between the fore rail and the aft rail, the vane segment further comprising fore axial ribs and aft axial ribs, each of the ribs extending from a respective one of the fore axial ribs to a respective one of the aft axial ribs.

9. A gas turbine engine comprising a turbine section, the turbine section including stators and rotors disposed in alternation along a central axis, at least one of the stators having vane segments circumferentially distributed around the central axis, the vane segments having vanes extending radially from inner ends to outer ends relative to the central axis, the vanes having leading edges, trailing edges, and chords extending from the leading edges to the trailing edges, a platform circumferentially extending around the central axis and being secured to a casing, the platform having an inner face facing the central axis and an opposed outer face, the vanes protruding radially inwardly from the inner face of the platform, and ribs protruding away from the outer face and having lengths extending along the outer face, at least one of the lengths intersecting a corresponding one of projections of the chords, the at least one of the ribs extending at least partially axially relative to the central axis, stiffeners protruding away from the outer face and having lengths extending along the outer face, the lengths of the stiffeners being oriented parallel to the projection of the chords, the lengths of the stiffeners free of intersection with the projections of the chords.

10. The gas turbine engine of claim 9, wherein the at least one of the lengths perpendicularly intersects the corresponding one of the projections of the chords.

11. The gas turbine engine of claim 9, wherein each of the lengths of the ribs intersects a respective one of the projections of the chords.

12. The gas turbine engine of claim 9, wherein each of the lengths of the ribs intersects two adjacent ones of the projections of the chords.

13. The gas turbine engine of claim 9, wherein one of two adjacent ones of the projections of the chords is intersected by a respective one of the lengths adjacent a leading edge of the one of the two adjacent ones of the projections of the chords, the other of the two adjacent ones of the projections of the chords is intersected by the respective one of the lengths adjacent a trailing edge of the other of the two adjacent ones of the projections of the chords.

14. The gas turbine engine of claim 9, wherein the stiffeners perpendicularly intersect the ribs.

15. The gas turbine engine of claim 9, wherein the platform includes a fore rail and an aft rail secured to the casing of the gas turbine engine, the outer face extending between the fore rail and the aft rail, the vane segment further comprising fore axial ribs and aft axial ribs, each of the ribs extending from a respective one of the fore axial ribs to a respective one of the aft axial ribs.

16. A vane segment for a gas turbine engine, the vane segment comprising:

vanes extending radially relative to a central axis, from inner ends to outer ends, the vanes having leading edges, trailing edges, and chords extending from the leading edges to the trailing edges;

a platform extending circumferentially relative to the central axis, the platform having a radially inner face and an opposed outer face, the inner face of the platform connected to the outer ends of the vanes, the platform including a fore rail and an aft rail, defined axially relative to the central axis, securable to a casing of the gas turbine engine, the outer face extending between the fore rail and the aft rail; and ribs having a thickness protruding away from the outer face and lengths extending along the outer face, at least one of the ribs being transverse to a corresponding one of projections of the chords, the at least one of the ribs extending at least partially axially relative to the central axis, the vane segment having fore axial ribs and aft axial ribs, each of the ribs extending from a respective one of the fore axial ribs to a respective one of the aft axial ribs.

17. The vane segment of claim 16, wherein the at least one of the ribs perpendicularly intersects the corresponding one of the projections of the chords.

18. The vane segment of claim 16, further comprising stiffeners protruding away from the outer face and having lengths extending along the outer face, the lengths of the stiffeners intersecting the lengths of the ribs.

19. The vane segment of claim 18, wherein at least one of the lengths of the stiffeners is free of intersection with the projections of the chords.

20. The vane segment of claim 16, wherein one of two adjacent ones of the projections of the chords is intersected by a respective one of the ribs adjacent a leading edge of the one of the two adjacent ones of the projections of the chords, the other of the two adjacent ones of the projections of the chords intersected by the respective one of the ribs adjacent a trailing edge of the other of the two adjacent ones of the projections of the chords.

* * * * *